(12) United States Patent
Webb

(10) Patent No.: US 10,408,250 B2
(45) Date of Patent: Sep. 10, 2019

(54) LOAD-INDICATING WASHER

(71) Applicant: The Boeing Company, Chicago, IL (US)

(72) Inventor: Sean Christian Webb, Isle of Palms, SC (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 15/428,114

(22) Filed: Feb. 8, 2017

(65) Prior Publication Data
US 2018/0223890 A1 Aug. 9, 2018

(51) Int. Cl.
*F16B 31/02* (2006.01)

(52) U.S. Cl.
CPC ............ *F16B 31/028* (2013.01); *F16B 31/02* (2013.01)

(58) Field of Classification Search
CPC ........ F16B 31/02; F16B 31/028; F16B 39/14; F16B 39/24; F16B 39/34; F16B 39/36; F16B 43/00
USPC .................................... 411/10, 11, 531, 544
See application file for complete search history.

(56) References Cited

U.S. PATENT DOCUMENTS

| | | | |
|---|---|---|---|
| 97,752 A * | 12/1869 | Billings | ................... F16B 39/34 411/301 |
| 198,445 A | 12/1877 | Ball | |
| 945,127 A | 1/1910 | Kollenberg | |
| 1,547,162 A | 7/1925 | Bohlman | |
| 1,569,837 A | 1/1926 | Macdonald | |
| 1,793,453 A | 2/1931 | Barili | |
| 1,801,999 A | 4/1931 | Bowman | |
| 1,963,535 A | 6/1934 | Trotter | |
| 2,278,062 A | 3/1942 | De | |
| 2,297,957 A * | 10/1942 | Hanneman | .............. F16B 39/24 411/155 |
| 2,339,549 A * | 1/1944 | Kubaugh | ................ F16B 43/00 37/457 |
| 2,476,561 A * | 7/1949 | Pedersen | ................. F16B 39/24 116/DIG. 34 |
| 2,555,291 A * | 5/1951 | Poupitch | ................... F16B 5/10 411/356 |
| 2,781,687 A | 2/1957 | T | |
| 2,795,444 A | 6/1957 | Nenzell | |
| 3,037,221 A | 6/1962 | Lanius | |
| 3,181,584 A | 5/1965 | Gordon | |
| 3,218,906 A | 11/1965 | Dupree | |
| 3,631,910 A | 1/1972 | Crowther et al. | |
| 3,659,491 A | 5/1972 | Duffy et al. | |

(Continued)

FOREIGN PATENT DOCUMENTS

JP          S54148956 A     11/1979

OTHER PUBLICATIONS

European Search Report; Application No. 17207852.9-1010; dated Jun. 18, 2018.

*Primary Examiner* — Roberta S Delisle
(74) *Attorney, Agent, or Firm* — Duft & Bornsen, PC

(57) ABSTRACT

A load-indicating washer for use with a fastener. The washer is comprised of a circular base plate, a domed cap that projects from the base plate, a cavity formed between the circular base plate and the domed cap, and a fastener hole that extends through the circular base plate and the domed cap. The domed cap is configured to collapse into the cavity upon application of a force that exceeds a threshold.

17 Claims, 5 Drawing Sheets

(56) References Cited

U.S. PATENT DOCUMENTS

| | | | |
|---|---|---|---|
| 3,678,979 A | 7/1972 | Bjorklumd | |
| 3,881,392 A | 5/1975 | Curtis | |
| 3,960,048 A | 6/1976 | Wagner | |
| 3,992,974 A | 11/1976 | Miki et al. | |
| 4,020,734 A * | 5/1977 | Bell | F16B 31/028 |
| | | | 411/10 |
| 4,072,081 A | 2/1978 | Curtis et al. | |
| 4,103,725 A | 8/1978 | Abe | |
| 4,138,198 A * | 2/1979 | Brown | F16B 39/24 |
| | | | 29/525.02 |
| 4,157,725 A | 6/1979 | Stanaitis | |
| 4,238,165 A | 12/1980 | Wagner | |
| 4,257,465 A | 3/1981 | Berg | |
| 4,292,007 A | 9/1981 | Wagner | |
| 4,302,136 A | 11/1981 | Abe et al. | |
| 4,347,024 A | 8/1982 | Coldren | |
| 4,431,353 A | 2/1984 | Capuano | |
| 4,435,112 A | 3/1984 | Becker | |
| 4,971,498 A | 11/1990 | Goforthe | |
| 5,489,177 A | 2/1996 | Schmidt | |
| 5,496,142 A | 3/1996 | Fodor et al. | |
| 5,547,326 A | 8/1996 | Overhues | |
| 5,653,564 A * | 8/1997 | Nakamura | F16B 37/14 |
| | | | 411/373 |
| 5,667,347 A | 9/1997 | Matthews | |
| 5,769,581 A | 6/1998 | Wallace et al. | |
| 5,829,933 A | 11/1998 | Kramer | |
| 5,904,460 A | 5/1999 | Kawabata | |
| 5,931,618 A | 8/1999 | Wallace et al. | |
| 6,062,790 A | 5/2000 | Huang | |
| 6,666,640 B1 * | 12/2003 | Hsieh | F16B 5/065 |
| | | | 165/80.3 |
| 6,843,153 B1 | 1/2005 | Rawson-Harris | |
| 6,959,627 B2 | 11/2005 | Doran | |
| 7,198,445 B2 | 4/2007 | Kramer | |
| 8,047,753 B2 * | 11/2011 | Dean | F16B 37/14 |
| | | | 411/531 |
| 2005/0260061 A1 | 11/2005 | Sung | |

* cited by examiner

LOAD-INDICATING WASHER

FIELD

This disclosure relates to the field of washers for use with a fastener, such as a bolt.

BACKGROUND

A washer is a piece of hardware that is traditionally used to distribute the load of a threaded fastener, such as a bolt. One particular type of washer may additionally be used to indicate the preload on the fastener used to join structural members. The preload on a fastener is the tension created in a fastener when it is tightened. The tension on the fastener creates a compressive force in the joint known as a clamping force. One type of preload washer has bumps that flatten when a certain preload is reached. Another type of preload washer has silicone that squirts out of grooves in the washer when a certain preload is reached.

Measuring of the load present at the joints of structural members is beneficial in areas of manufacturing, such as aerospace. Therefore, it is desirable to design and use improved load-indicating washers.

SUMMARY

Embodiments described herein provide for a load-indicating washer having a domed shape that plastically deforms when put under a particular load by a fastener. The load-indicating washer may be used on the fastener at a joint, such as a joint between layers of a composite material. As a clamping force is applied by the fastener at the joint, the force/load is also applied to the load-indicating washer. Due to the geometry and characteristics of the load-indicating washer, the domed-portion may collapse if the force/load exceeds a threshold. Therefore, the load-indicating washer may be used to indicate the load at the joint.

One embodiment comprises a washer for a fastener. The washer is comprised of a circular base plate, a domed cap that projects from the base plate, a cavity formed between the circular base plate and the domed cap, a fastener hole that extends through the circular base plate and the domed cap.

In another embodiment, the washer is formed from a metallic material.

In another embodiment, the domed cap is configured to collapse into the cavity upon application of a clamping force by the fastener that exceeds a yield strength of the domed cap.

In another embodiment, the cavity has a semi-elliptical cross-section.

In another embodiment, the yield strength of the domed cap is determined based on a major axis of the semi-elliptical cross-section of the cavity, a minor axis of the semi-elliptical cross-section of the cavity, a thickness of the domed cap, and the metallic material.

In another embodiment, a thickness of the circular base plate is greater than a thickness of the domed cap.

In another embodiment, a thickness of the domed cap decreases from the circular base plate to the fastener hole.

In another embodiment, the fastener hole is sized to be slid upon a fastener.

Another embodiment comprises a domed-shaped washer. The domed-shaped washer includes a base plate that is circular along a first plane, a convex wall that projects outward from a circumference of the base plate, a cavity between the base plate and the convex wall having a plano-convex shape along a second plane orthogonal to the first plane, and a fastener hole that extends through the base plate and the convex wall through a center axis of the domed-shaped washer.

In another embodiment, the domed-shaped washer is formed from a metallic material.

In another embodiment, the convex wall is configured to collapse into the cavity and plastically deform upon application of a clamping force by a fastener that exceeds a yield strength of the convex wall.

In another embodiment, a thickness of the base plate is greater than a thickness of the convex wall.

In another embodiment, a thickness of the convex wall decreases from the base plate to the fastener hole.

In another embodiment, the fastener hole is sized to be slid upon a fastener.

Another embodiment comprises a method of determine a clamp-up load at a joint of structural members. The method includes acquiring a washer that comprises a circular base plate, a domed cap that projects from the circular base plate and forms a cavity between the domed cap and the circular base plate, and a fastener hole that extends through the domed cap and the circular base plate. The method further includes sliding the washer onto a shank of a fastener via the fastener hole so that the domed cap engages the fastener, inserting the shank of the fastener into a pass-through hole at the joint, and applying an increasing clamping force to the joint with the fastener. The method further includes inspecting the joint for a gap between the structural members, and determining that the clamp-up load at the joint does not exceed a threshold when the gap is closed and the domed cap of the washer has not collapsed into the cavity.

In another embodiment, the method further includes determining that the clamp-up load at the joint exceeds the threshold when the gap is not closed and the domed cap of the washer has collapsed into the cavity.

In another embodiment, the fastener comprises a bolt and a nut. The method further includes threading the nut onto the bolt, and applying an increasing torque to the nut to apply the increasing clamping force to the joint.

In another embodiment, the structural members comprise layers of a composite material.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
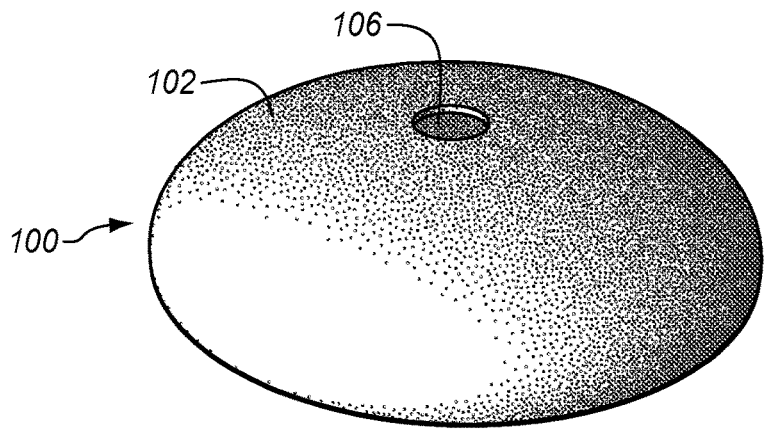
FIGS. 1-2 are perspective views of a load-indicating washer in an exemplary embodiment.
Figure 2:
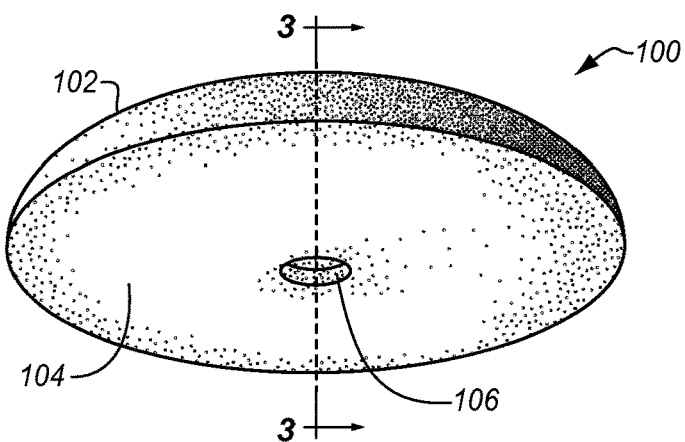

FIGS. 1-2 are perspective views of a load-indicating washer 100 in an exemplary embodiment. Washer 100 is used in conjunction with a fastener to join two or more structural members together. The top portion of washer 100 in FIG. 1 is comprised of a domed cap 102, which represents the portion of washer 100 that engages the fastener (e.g., the head of the fastener, a nut of a fastener, etc.). The bottom portion of washer 100 in FIG. 2 defines a base plate 104, which represents the portion of washer 100 that engages a surface of a structural member, another washer, etc. Washer 100 also includes a fastener hole 106, which allows washer 100 to be slid onto the fastener.

Domed cap 102 is comprised of a layer or wall of material (e.g., metal) that projects from base plate 104 and has a domed or convex shape. Base plate 104 is comprised of a circular layer of material (e.g., metal) that may be substantially planar or flat to distribute a load of the fastener across a surface of a structural member. Domed cap 102 and base plate 104 may be integrally formed so that washer 100 has a unibody structure formed from a metallic material, such as aluminum.

Figure 3:
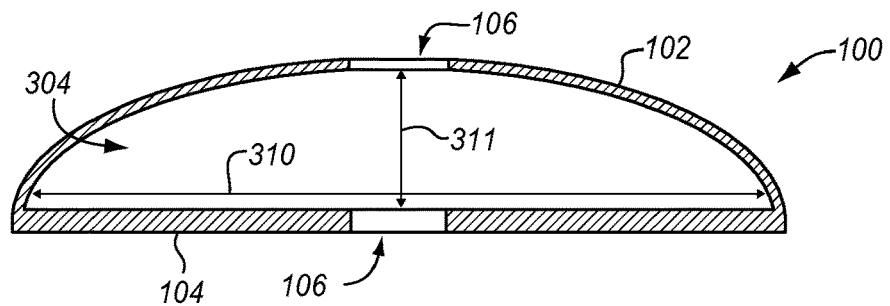
FIG. 3 is a cross-sectional view of a load-indicating washer in an exemplary embodiment.

FIG. 3 is a cross-sectional view of washer 100 in an exemplary embodiment. FIG. 3 is a cross-section along line 3-3 of FIG. 2. Domed cap 102 is formed from a convex wall that projects outward from base plate 104. In this embodiment, the convex wall projects from the circumference of base plate 104. The shape of domed cap 102 forms a cavity 304 between base plate 104 and domed cap 102, which is a hollow or empty space between base plate 104 and domed cap 102. Cavity 304 has a semi-elliptical or plano-convex shape when viewed at a cross-section (i.e., along a plane that is orthogonal to the plane of base plate 104).

Figure 4:
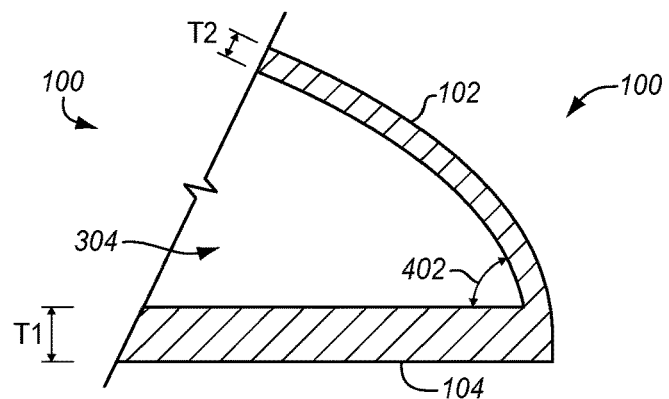
FIG. 4 is a partial cross-sectional view of a load-indicating washer in an exemplary embodiment.
Figure 5:
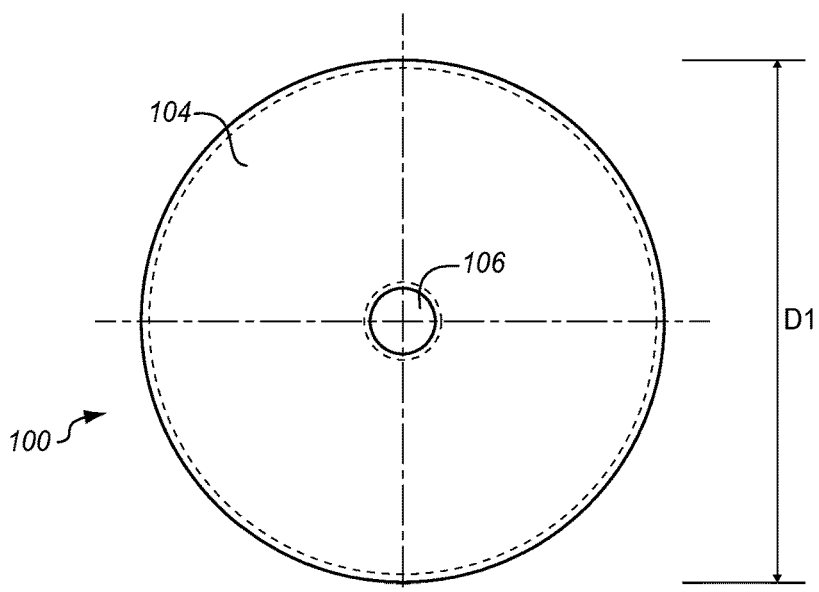
FIG. 5 is a bottom view of a load-indicating washer in an exemplary embodiment.

FIG. 4 is a partial cross-sectional view of washer 100 in an exemplary embodiment. Base plate 104 has a thickness of T1, and domed cap 102 has a thickness of T2. Although the thicknesses of base plate 104 and domed cap 102 may vary based on design choice, the thickness T1 of base plate 104 may be greater than a thickness T2 of domed cap 102. This may allow domed cap 102 to plastically deform before or instead of base plate 104. Also, the thickness T2 of domed cap 102 may decrease or taper from the point at which it projects from base plate 104 to fastener hole 106 (see also, FIG. 3). The interface between domed cap 102 and base plate 104 defines an angle 402. FIG. 5 is a bottom view of washer 100 in an exemplary embodiment. Base plate 104 has a diameter D1, which may vary as desired based on design choice. Fastener hole 106 may extend through a center axis of base plate 104 (and domed cap 102) as shown in FIG. 5.

Figure 6:
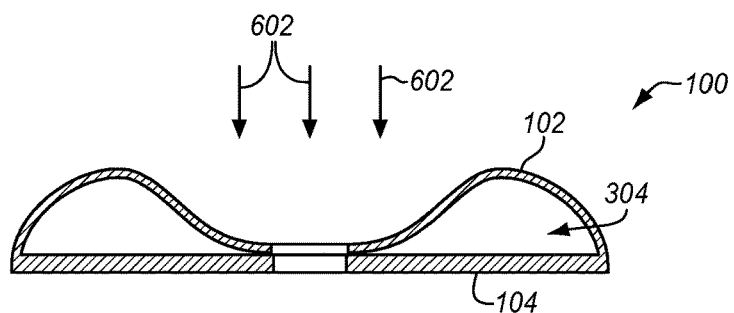
FIG. 6 is a cross-sectional view of a load-indicating washer where the domed cap is collapsed in an exemplary embodiment.
Figure 7:
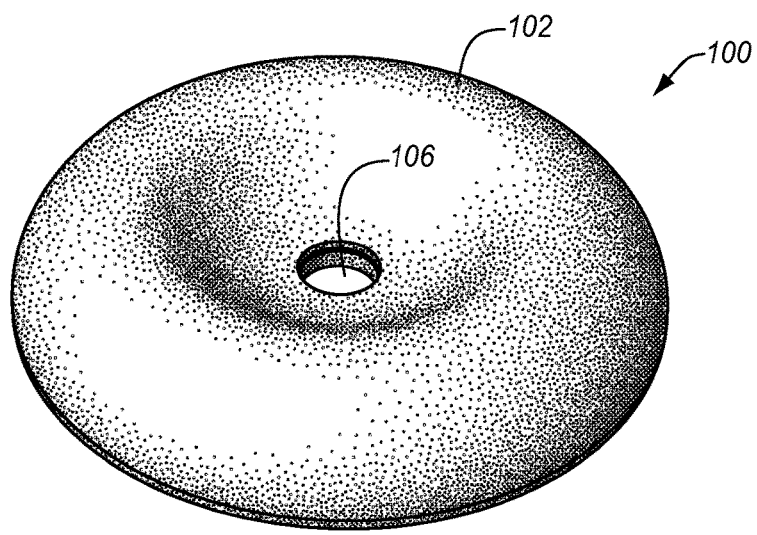
FIG. 7 is a perspective view of a load-indicating washer where the domed cap is collapsed in an exemplary embodiment.

Washer 100 is designed so that domed cap 102 collapses into cavity 304 if a high enough force is applied to domed cap 102 by a fastener. FIG. 6 is a cross-sectional view of washer 100 where domed cap 102 is collapsed in an exemplary embodiment. As is evident in this figure, a force 602 (e.g., a clamping force from a fastener) or load that exceeds a threshold, yield strength, compressive strength, or elastic limit of domed cap 102 will cause domed cap 102 to collapse into cavity 304 and plastically deform. The threshold may depend on a variety of design characteristics of washer 100. For example, the threshold may be determined based on the major axis 310 of the semi-elliptical cross-section of cavity 304 (see FIG. 3), the minor axis 311 of the semi-elliptical cross-section of cavity 304, the thickness T2 of domed cap 102, and the material used to form washer 100. The threshold may also be determined based on the thickness T1 of base plate 104, the diameter D1 of base plate 104, the angle 402 between domed cap 102 and base plate 104 (see FIG. 4), and possibly other characteristics. The circular diameter D1 of base plate 104 may be geometrically related to the major axis 310 of the semi-elliptical cross-section of cavity 304. For example, the diameter D1 may be equivalent to the summation of the major axis 310 of the semi-elliptical cross-section of cavity 304 and twice the thickness T1 at the intersection of domed cap 102 and base plate 104. FIG. 7 is a perspective view of washer 100 where domed cap 102 is collapsed in an exemplary embodiment.

Figure 8:
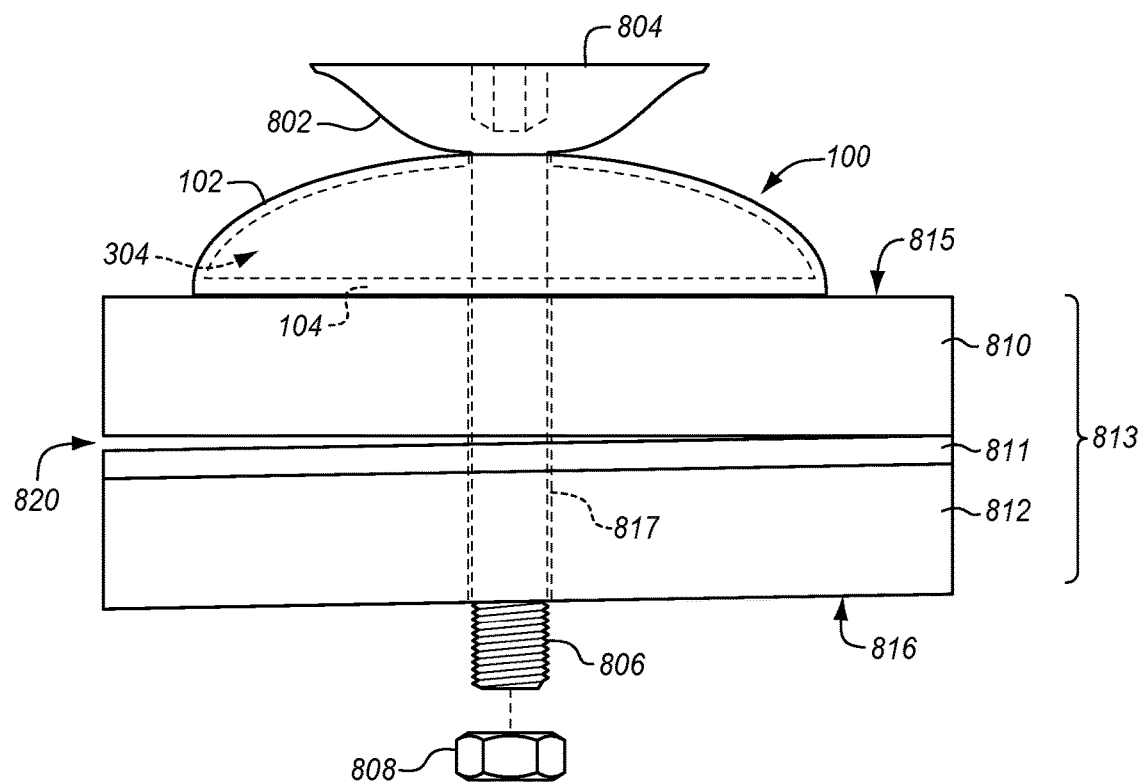
FIGS. 8-9 illustrate a load-indicating washer used on a fastener in an exemplary embodiment.
Figure 9:
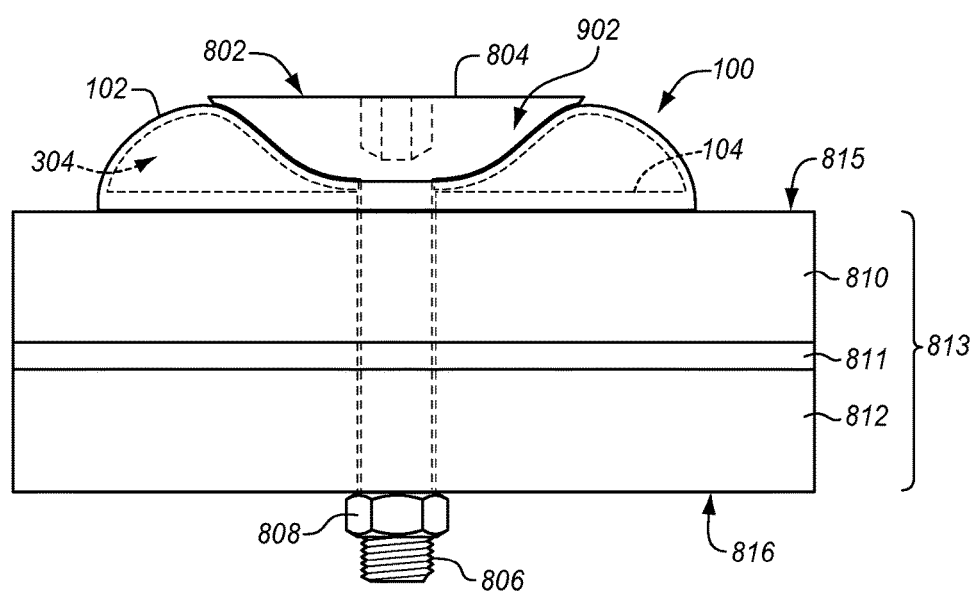

FIGS. 8-9 illustrate washer 100 used on a fastener in an exemplary embodiment. Fastener 802 is a bolt with a nut in this embodiment, but fastener 802 may comprise another type of fastener in other embodiments, such as a screw, a rivet, etc. Fastener 802 is used to secure the faying surfaces of structural members 810-812 at a joint 813. Structural members 810-812 may comprise layers of a composite material formed from multiple constituent materials, such as a Carbon Fiber Reinforced Polymer (CFRP) material. Structural members 810-812 may alternatively comprise any parts, objects, materials, etc., that are being joined. Joint 813 has a pass-through hole 817 that extends from a top surface 815 to a bottom surface 816 for fastener 802.

In this embodiment, washer 100 is slid over the shank 806 of fastener 802 until domed cap 102 engages with the fastener head 804. Fastener 802 may then be inserted into pass-through hole 817 of joint 813 as shown in FIG. 8, where base plate 104 of washer 100 contacts the top surface 815 of joint 813. Nut 808 may then be threaded onto the threaded end of shank 806. The hardware used at joint 813 is just one embodiment, as other flat washers or other hardware may be used with fastener 802 and washer 100.

Washer 100 is advantageously able to indicate a load at joint 813. Fastener 802 is tensioned by the application of torque to either fastener head 804 or nut 808. The applied torque causes a tensioning of fastener 802, and creates a clamping force that compresses structural members 810-812. If the clamping force created by fastener 802 exceeds the yield strength of domed cap 102, then domed cap 102 will collapse into cavity 304 and plastically deform (see FIG. 9). Washer 100 may therefore act as a sensing mechanism that has a mechanical response (i.e., collapse of domed cap 102) to loads that exceed the elastic limit of the geometry and material used for washer 100. As described above, the design characteristics of washer 100 determine the yield strength of domed cap 102. For example, the thickness T2 of domed cap 102 and the thickness T1 of base plate 104 (see FIG. 3) may be selected to meet the desired plastic yielding point of washer 100, which corresponds with the clamping force needed for joint 813. The thickness T2 of domed cap 102 in conjunction with the thickness T1 and diameter D1 of base plate 104 determine the designed angle 402 within cavity 304 (see FIG. 4) and the resulting volume of cavity 304. The plastic deformation of washer 100 results in providing no additional preload to fastener 802. This is because the stored elastic energy that naturally provides a linear opposing, resistive force is released once the crystalline lattice structure permanently dislocates and breaks atomic bonds within the metallic structure. This can be advantageous in tension critical joints, in which additional preload could detrimentally affect static and fatigue life cycle of fastener 802 or adjoining structural members 810-812. Due to this, after the deformation completes, washer 100 can act as a standard flat washer with a given thickness, or can be discarded once the information obtained is used to make a decision on design intent of joint 813 (e.g., load required to close the gap is out-of-tolerance).

An additional advantage of washer 100 is the geometric design is such that the plastic (permanent) deformation of dome cap 102 provides a recessed cavity 902 for fastener head 804 to reside. An additional embodiment provides a solution for preventing thread movement in bolted joints due to vibrations, and tamper-proof fastened joints in high-security applications. By injecting a two-part epoxy resin and hardener into recessed cavity 902, the hardened filler is capable of preventing loosening of joint 813 due to dynamic loading and future access to the joint for security applications. If fastener head 804 is designed sufficiently smaller than recessed cavity 902, the resin is capable of fully encapsulating fastener 802, preventing tool access to internal and external surfaces of fastener head 804 needed to disassemble joint 813. Additionally, the post-force geometry of washer 100 is such that the mixture of the epoxy resin is well contained, without spill, leak, or additional containment devices needed.

One particular application of washer 100 is to determine the clamp-up force/load at a joint. There may not be a flush alignment between the mating or faying surfaces of structural members 810-812 at joint 813. For example, structural member 810 may have a deformation (e.g., slight curve or bend), which creates a gap 820 between structural member 810 and structural member 811 (see FIG. 8). This gap 820 creates an opposition force or opposition strength at joint 813 that has to be overcome by the clamping force of fastener 802 to bridge gap 820, which is referred to as a clamp-up force or clamp-up load. The clamp-up load is an added residual load at joint 813, which needs to be overcome by the clamping force of fastener 802 to merge the gap 820 between structural members 810-812. A limit or threshold is placed on the added load at joint 813 in a production environment so that fastener 802 and structural members 810-812 are not structurally-aged, resulting in loss of static and fatigue strength. Therefore, it may be desirable to know whether the amount of clamp-up load at a joint exceeds a threshold.

Figure 10:
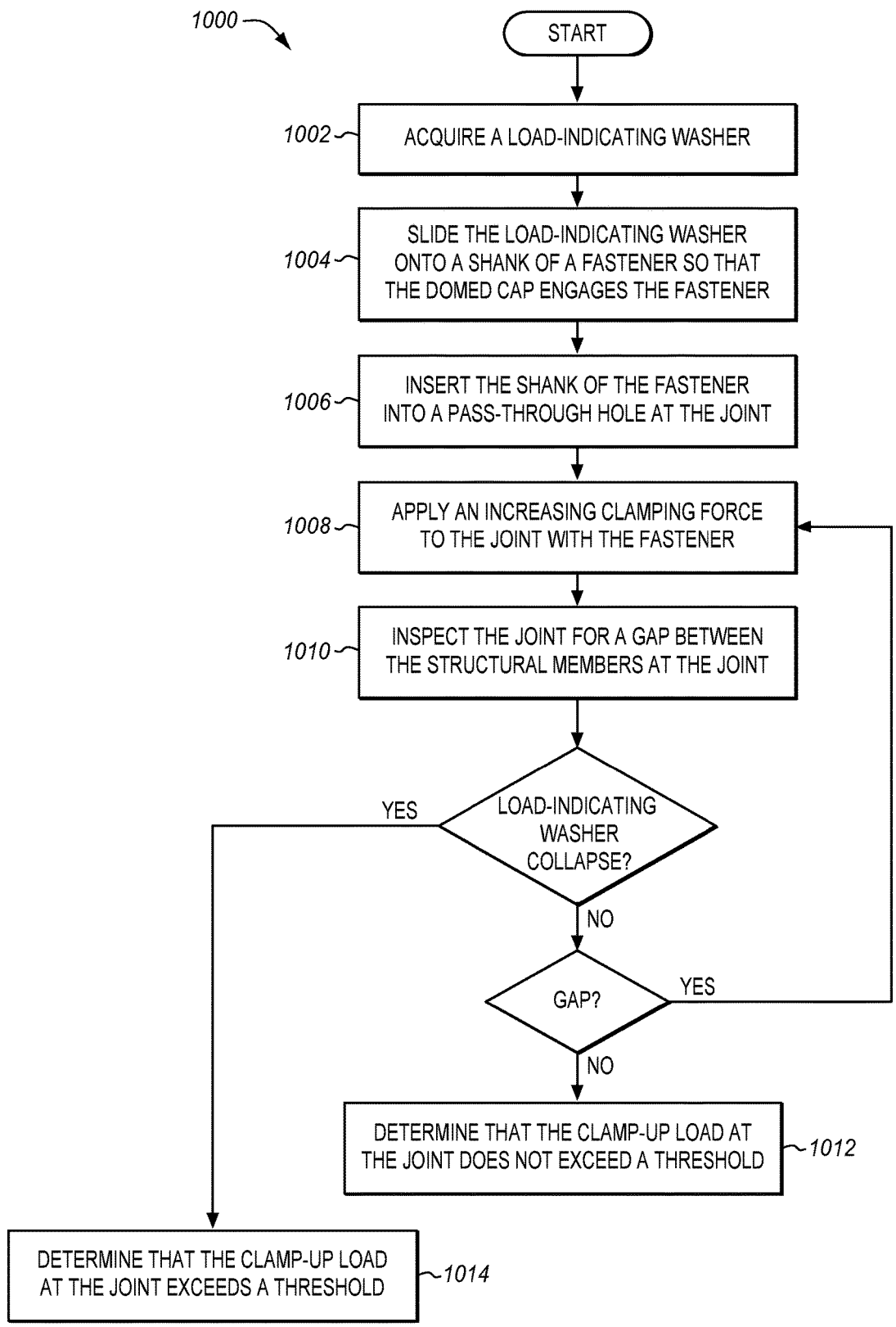
FIG. 10 is a flow chart illustrating a method of using a load-indicating washer to determine the clamp-up load at a joint in an exemplary embodiment.

FIG. 10 is a flow chart illustrating a method 1000 of using washer 100 to determine the clamp-up load at a joint in an exemplary embodiment. The steps of method 1000 will be described with reference to FIGS. 8-9, but those skilled in the art will appreciate that method 1000 may be performed with other fasteners and on other joints. The steps of this flow chart are not all inclusive and may include other steps not shown, and the steps may be performed in an alternative order.

The steps of method 1000 may be performed by an operator or an automated system (e.g. robot) in assembling a structure formed from structural members 810-812 (e.g., layers of a composite structure), such as is shown in FIGS. 8-9. Method 1000 includes acquiring (step 1002) a washer 100 as described above, and sliding (step 1004) washer 100 onto a shank of a fastener so that the domed cap 102 engages the fastener (see FIG. 8). Method 1000 further includes inserting (step 1006) the shank of the fastener into a pass-through hole at the joint (see FIG. 8). If the fastener is a bolt as shown in FIG. 8, then the nut may be threaded onto the bolt. Method 1000 further includes applying (step 1008) an increasing clamping force to joint 813 with the fastener. For example, an operator may apply torque to either a fastener head or nut of the fastener. The applied torque causes a tensioning of the fastener and creates compression in structural members 810-812. Method 1000 further includes inspecting (step 1010) joint 813 for a gap 820 between structural members 810-812.

When gap 820 is closed and domed cap 102 of washer 100 has not collapsed into cavity 304, method 1000 further includes determining (step 1012) that the clamp-up force at joint 813 does not exceed a threshold. Because the clamp-up force at joint 813 does not exceed the threshold, gap 820 does not add an unacceptable load at joint 813. Thus, joint 813 may be verified to be within acceptable manufacturing tolerances. At this point, additional torque may be applied to the fastener until a desired torque is reached (generally a percentage of the fastener's proof strength). This additional torque creates a clamping force that overcomes the yield strength of washer 100 so that it collapses, and washer 100 acts as a standard flat washer. Alternatively, washer 100 may be removed from the fastener after indicating the clamp-up force and discarded.

When gap 820 is not closed and domed cap 102 of washer 100 has collapsed into cavity 304, method 1000 further includes determining (step 1014) that the clamp-up force at joint 813 exceeds the threshold. Because the clamp-up force at joint 813 exceeds the threshold, gap 820 adds an unacceptable amount of load at joint 813 which may negatively affect the structural integrity of joint 813. Thus, joint 813 may not be within acceptable manufacturing tolerances.

Although specific embodiments were described herein, the scope is not limited to those specific embodiments. Rather, the scope is defined by the following claims and any equivalents thereof.

What is claimed is:

1. A load-indicating washer comprising:
   a circular base plate;
   a domed cap that projects from the base plate, wherein the domed cap and the circular base plate are integrally formed so that the load-indicating washer has a unibody structure;
   a cavity formed between the circular base plate and the domed cap; and
   a fastener hole that extends through the circular base plate and the domed cap.

2. The load-indicating washer of claim 1 wherein:
   the circular base plate and the domed cap are formed from a metallic material.

3. The load-indicating washer of claim 2 wherein:
   the domed cap is configured to plastically deform upon application of a clamping force by a fastener that exceeds a yield strength of the domed cap.

4. The load-indicating washer of claim 3 wherein:
the cavity has a semi-elliptical cross-section.

5. The load-indicating washer of claim 4 wherein:
the yield strength of the domed cap is determined based on:
- a major axis of the semi-elliptical cross-section of the cavity;
- a minor axis of the semi-elliptical cross-section of the cavity;
- a thickness of the domed cap; and
- the metallic material.

6. The load-indicating washer of claim 1 wherein:
a thickness of the circular base plate is greater than a thickness of the domed cap.

7. The load-indicating washer of claim 1 wherein:
a thickness of the domed cap decreases from the circular base plate to the fastener hole.

8. The load-indicating washer of claim 1 wherein:
the fastener hole is sized to be slid upon a fastener.

9. A load-indicating washer comprising:
a base plate formed from a metallic material, and that is circular along a first plane;
a convex wall that projects outward from a circumference of the base plate, and is integrally formed with the base plate from the metallic material;
a cavity between the base plate and the convex wall having a plano-convex shape along a second plane orthogonal to the first plane; and
a fastener hole that extends through the base plate and the convex wall through a center axis of the base plate.

10. The load-indicating washer of claim 9 wherein:
the convex wall is configured to collapse into the cavity and plastically deform upon application of a clamping force by a fastener that exceeds a yield strength of the convex wall.

11. The load-indicating washer of claim 9 wherein:
a thickness of the base plate is greater than a thickness of the convex wall.

12. The load-indicating washer of claim 9 wherein:
a thickness of the convex wall decreases from the base plate to the fastener hole.

13. The load-indicating washer of claim 9 wherein:
the fastener hole is sized to be slid upon a fastener.

14. A method of determining a clamp-up load at a joint of structural members, the method comprising:
acquiring a load-indicating washer that comprises a circular base plate, a domed cap that projects from the circular base plate and forms a cavity between the domed cap and the circular base plate, and a fastener hole that extends through the domed cap and the circular base plate, wherein the domed cap and the circular base plate are integrally formed so that the load-indicating washer has a unibody structure;
sliding the load-indicating washer onto a shank of a fastener via the fastener hole so that the domed cap engages the fastener;
inserting the shank of the fastener into a pass-through hole at the joint;
applying an increasing clamping force to the joint with the fastener;
inspecting the joint for a gap between the structural members; and
determining that the clamp-up load at the joint does not exceed a threshold when the gap is closed and the domed cap of the load-indicating washer has not collapsed into the cavity.

15. The method of claim 14 further comprising:
determining that the clamp-up load at the joint exceeds the threshold when the gap is not closed and the domed cap of the load-indicating washer has collapsed into the cavity.

16. The method of claim 14 wherein the fastener comprises a bolt and a nut, and further comprising:
threading the nut onto the bolt; and
applying an increasing torque to the nut to apply the increasing clamping force to the joint.

17. The method of claim 14 wherein:
the structural members comprise layers of a composite material.

* * * * *